(12) United States Patent
Azuma et al.

(10) Patent No.: US 11,231,694 B2
(45) Date of Patent: Jan. 25, 2022

(54) INFORMATION PROCESSING DEVICE, INFORMATION PROCESSING METHOD, AND NON-TRANSITORY RECORDING MEDIUM

(71) Applicant: NEC Corporation, Tokyo (JP)

(72) Inventors: Tan Azuma, Tokyo (JP); Soichiro Araki, Tokyo (JP); Kenichiro Fujiyama, Tokyo (JP); Mineto Satoh, Tokyo (JP); Tetsuri Ariyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 98 days.

(21) Appl. No.: 16/487,144

(22) PCT Filed: Mar. 9, 2018

(86) PCT No.: PCT/JP2018/009223
§ 371 (c)(1),
(2) Date: Aug. 20, 2019

(87) PCT Pub. No.: WO2018/168691
PCT Pub. Date: Sep. 20, 2018

(65) Prior Publication Data
US 2019/0377321 A1 Dec. 12, 2019

(30) Foreign Application Priority Data

Mar. 17, 2017 (JP) .............................. JP2017-052244

(51) Int. Cl.
*G06N 20/00* (2019.01)
*G06F 17/10* (2006.01)
*G06F 17/18* (2006.01)
*G06N 7/00* (2006.01)
*G06K 9/62* (2006.01)
*H04L 29/06* (2006.01)
*G05B 19/402* (2006.01)
(Continued)

(52) U.S. Cl.
CPC ............ *G05B 19/402* (2013.01); *G06F 17/11* (2013.01); *G06N 5/02* (2013.01); *G05B 2219/37333* (2013.01); *G05B 2219/40335* (2013.01)

(58) Field of Classification Search
CPC .......... G06N 20/00; G06N 7/005; G06N 5/02; G05B 19/402; G05B 15/02; G05B 23/024;
(Continued)

(56) References Cited

U.S. PATENT DOCUMENTS 6,427,100 B1 * 7/2002 Kaku ...................... B60L 15/20
701/22
6,577,908 B1 6/2003 Wojsznis et al.
(Continued)

FOREIGN PATENT DOCUMENTS

EP 2041637 B1 3/2013
JP H04-063404 B2 10/1992
(Continued)

OTHER PUBLICATIONS

Cho et al., Uncertainty modeling in communication for remote control system based on stochastic hybrid system approach, 4 pages (Year: 2013).*
(Continued)

*Primary Examiner* — Thuy Dao
(74) *Attorney, Agent, or Firm* — Sughrue Mion, PLLC/C

(57) ABSTRACT

Provided is an information processing device, etc., that provides information which is the basis for quick detection of abnormalities that occur in a device. An information processing device calculates a degree of suitability between observation information and prediction information, the observation information observed for a system suffering an effect from an certain device, the prediction information
(Continued)

predicted in accordance with a model for a state of the system; and calculates a difference between manipulation amount to the certain device and predictive manipulation amount predicted for the manipulation amount based on the model, the difference being a difference in case that the degree satisfies a predetermined calculation condition.

6 Claims, 8 Drawing Sheets

(51) Int. Cl.
  *G06F 17/11* (2006.01)
  *G06N 5/02* (2006.01)
(58) Field of Classification Search
  CPC ..... G05B 23/0254; G06F 17/11; G06F 17/02; G06F 17/18; B64C 2201/108; B64C 2201/027; B64C 39/024; G06Q 50/06; H04L 67/12; G16H 50/50; G16H 50/20; G16H 50/30; A61B 5/264; A61B 5/7267; A61B 5/02055; A61B 5/316; A61B 5/366; A61B 5/349; G06K 9/6297; G06K 9/00369
  See application file for complete search history.

(56) References Cited

U.S. PATENT DOCUMENTS

| | | | | |
|---|---|---|---|---|
| 10,126,718 | B2 * | 11/2018 | Namie | G05B 13/048 |
| 2007/0179746 | A1 * | 8/2007 | Jiang | G06F 11/008 |
| | | | | 702/185 |
| 2008/0082304 | A1 * | 4/2008 | Miller | G05B 17/02 |
| | | | | 703/9 |
| 2008/0110238 | A1 * | 5/2008 | Kariya | F01N 11/002 |
| | | | | 73/23.31 |
| 2011/0186353 | A1 | 8/2011 | Turner et al. | |
| 2011/0276828 | A1 * | 11/2011 | Tamaki | G05B 23/0254 |
| | | | | 714/26 |
| 2012/0001574 | A1 * | 1/2012 | Akaishi | H02P 29/032 |
| | | | | 318/400.04 |
| 2014/0195868 | A1 * | 7/2014 | Hasegawa | G06F 11/079 |
| | | | | 714/724 |
| 2014/0286372 | A1 | 9/2014 | Kobayashi et al. | |
| 2018/0245031 | A1 | 8/2018 | Sato et al. | |
| 2019/0101908 | A1 * | 4/2019 | Park | G08B 21/18 |

FOREIGN PATENT DOCUMENTS

| | | |
|---|---|---|
| JP | 2010-063305 A | 3/2010 |
| JP | 2014-182694 A | 9/2014 |
| WO | 2014/155596 A1 | 10/2014 |
| WO | 2017/043203 A1 | 3/2017 |

OTHER PUBLICATIONS

International Search Report for PCT Application No. PCT/JP2018/009223 dated Jun. 5, 2018.

English translation of Written opinion for PCT Application No. PCT/JP2018/009223.

Extended European Search Report for EP Application No. EP18768068.1 dated on Feb. 27, 2020.

* cited by examiner

INFORMATION PROCESSING DEVICE, INFORMATION PROCESSING METHOD, AND NON-TRANSITORY RECORDING MEDIUM This application is a National Stage Entry of PCT/JP2018/009223 filed on Mar. 9, 2018, which claims priority from Japanese Patent Application 2017-052244 filed on Mar. 17, 2017, the contents of all of which are incorporated herein by reference, in their entirety.

TECHNICAL FIELD

The present invention relates to an information processing device and the like that detects, for example, an abnormality of a device in a system.

BACKGROUND ART

A farming system, a factory system, or the like includes an actuator, a sensor, and a controller. The controller inputs observation information acquired by a sensor for observing the system. The controller generates a control signal for controlling the actuator, based on the input observation information, and transmits the generated control signal to the actuator. The actuator receives the control signal transmitted from the controller, and executes actuation in accordance with the received control signal in the system. The control signal is, for example, an electronic signal or a physical signal. The actuation executed by the actuator causes a change in the system. The sensor observes the change that occurs in the system, and transmits an observation signal indicating a result of the observation to the controller.

PTL 1 or PTL 2 discloses an example of a device for detecting an abnormality of an actuator in a system as described above.

The device disclosed in PTL 1 detects an abnormality of an actuator that converts supplied electric power into a physical momentum. The device monitors a current supplied to the actuator when the current transits from a steady state to a transient state. The device determines that an abnormality of the actuator occurs when the device detects that the current exceeds a predetermined threshold value. When the device is an actuator itself, the actuator detects an abnormality of an own device by performing processing as described above.

The device disclosed in PTL 2 compares a control signal transmitted from an electronic control device to an actuator with an actuation state signal indicating an actuation state of the actuator when the actuator performs processing in accordance with the control signal, and detects an abnormality of the actuator based on a result of the comparison.

CITATION LIST

Patent Literature

PTL 1: Japanese Unexamined Patent Application Publication No. 2010-063305
PTL 2: Japanese Unexamined Patent Application Publication No. 1992(H4)-063404

SUMMARY OF INVENTION

Technical Problem

When an actuator is in a normal state, the actuator executes actuation in accordance with an input control signal in a system. However, when the actuator is in an abnormal state, the actuator does not necessarily execute actuation in accordance with the input control signal, and may execute abnormal actuation. In this way, an unstable state in which abnormal actuation is executed at times may occur as a sign of an actuator failure.

However, the device disclosed in PTL 1 or 2 cannot detect an unstable state that occurs as a sign of an actuator failure. A reason for this is that the device disclosed in PTL 1 or 2 detects that an abnormality occurs in the actuator based on an event that occurs at one timing with respect to the actuator.

Thus, one object of the present invention is to provide an information processing device and the like that provide information being a basis for early detection of an abnormality of a device.

Solution to Problem

As an aspect of the present invention, an information processing device includes:

degree calculation means for calculating a degree of suitability between observation information and prediction information, the observation information observed for a system suffering an effect from an certain device, the prediction information predicted in accordance with a model for a state of the system; and difference calculation means for calculating a difference between manipulation amount to the certain device and predictive manipulation amount predicted for the manipulation amount based on the model, the difference being a difference in case that the degree satisfies a predetermined calculation condition.

In addition, as another aspect of the present invention, an information processing method, by a calculation processing device, includes:

calculating a degree of suitability between observation information and prediction information, the observation information observed for a system suffering an effect from an certain device, the prediction information predicted in accordance with a model for a state of the system; and calculating a difference between manipulation amount to the certain device and predictive manipulation amount predicted for the manipulation amount based on the model, the difference being a difference in case that the degree satisfies a predetermined calculation condition.

In addition, as another aspect of the present invention, an information processing program causes a computer to achieve:

a degree calculation function for calculating a degree of suitability between observation information and prediction information, the observation information observed for a system suffering an effect from an certain device, the prediction information predicted in accordance with a model for a state of the system; and a difference calculation function for calculating a difference between manipulation amount to the certain device and predictive manipulation amount predicted for the manipulation amount based on the model, the difference being a difference in case that the degree satisfies a predetermined calculation condition.

Furthermore, the object is also achieved by a computer-readable recording medium that records the program.

Advantageous Effects of Invention

An information processing device and the like according to the present invention can provide information being a basis for early detection of an abnormality of a device.

EXAMPLE EMBODIMENT

Figure 1:
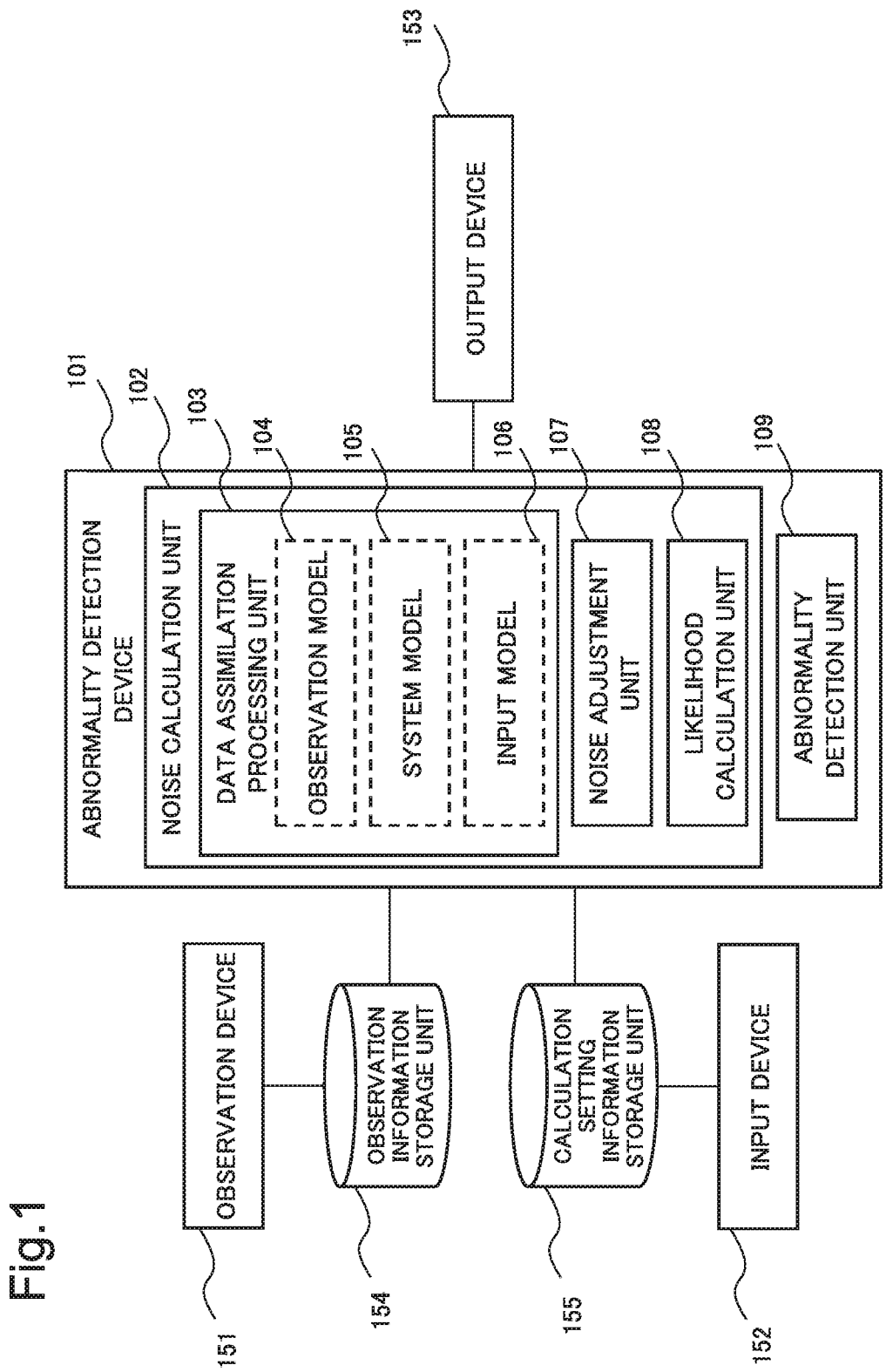
FIG. 1 is a block diagram illustrating a configuration of an abnormality detection device according to a first example embodiment of the present invention.

First, technical terms will be described for facilitating understanding of the invention of the present application.

A variable or a parameter denotes a certain storage region in a storage device (storage unit). Processing of setting data to a variable (or processing of setting a value to a parameter) denotes processing of storing data in a storage region identified by the variable (or the parameter). Further, a value related to a variable (parameter) is also represented as a "value of a variable (parameter)" or a "variable (parameter) value". A value of a parameter represents a value stored in a storage region identified by the parameter. For convenience of description, a value A of a parameter is also simply represented as a "parameter A". Further, in the following description, a "parameter" and a "variable" may be used separately in accordance with a target of description, but the "parameter" and the "variable" represent similar contents.

Further, the following Eqn. A denotes a conditional probability P that a random variable U is D when a value of a random variable S is C.

$$P(U=D|S=C) \tag{Eqn. A}$$

Further, it is assumed in the present application that a value of a random variable is denoted by using a subscript of the random variable. In this case, Eqn. A can be represented as indicated in Eqn. B:

$$P(U=U_{DIS}=S_C) \tag{Eqn. B}$$

Further, for convenience of description, it is assumed in the present application that the random variable S and the random variable U are abbreviated. In this case, Eqn. B can be represented as indicated in Eqn. C:

$$P(U_{DIS}C) \tag{Eqn. C}$$

A model represents a relevance related to a system state and the like. The model represents, for example, information representing a relevance between system states that change with transition of time or a relevance between a plurality of kinds of information acquired by observation of a system.

A data assimilation technique is an example of a technique capable of accurately predicting a state that actually occurs in regard to a system. In the data assimilation technique, a variable (parameter) representing uncertainty is introduced in the model in order to achieve an object and the like of matching a state predicted based on the model to observation information (observation data) acquired by observation of the system.

In the data assimilation technique, for example, a state space model representing a system state is used as the model. The model according to the present example embodiment may include at least any of an input model (described later) and a system model exemplified in Eqn. 1. The input model represents a relevance between an input to an actuator and a state (or an output) acquired by processing the input by the actuator. In other words, the model may represent a relevance with some sort of information related to an input to an actuator. In other words, the model may include information representing an input to an actuator, and represent a relevance between the input and certain information. The state space model includes, for example, a system model exemplified in Eqn. 1 and an observation model exemplified in Eqn. 2.

$$x_t = f_t(x_{t-1}) + v_t \tag{Eqn. 1}$$

$$y_t = h_t(x_t) + w_t \tag{Eqn. 2}$$

Note that $x_t$ denotes state information representing a system state at a timing t. The state may represent a plurality of kinds of states. $f_t$ denotes processing (represented by using a function in Eqn. 1) of generating the state information $x_t$ at the timing t based on state information $x_{t-1}$ at a timing (t−1). In Eqn. 1, $f_t$ denotes processing of generating a state at a timing (namely, the timing t) that is one timing ahead. $v_t$ denotes a system noise introduced for an object of accurately predicting an actual state observed in regard to a system. The system noise is information that interpolates a difference between information calculated by applying the processing indicated by $f_t$ to the state information $x_{t-1}$ and a state that needs to be calculated in order to achieve the object as described above.

$y_t$ denotes observation information related to a system at the timing t. $h_t$ denotes processing (represented by using a function in Eqn. 2) applied when the observation information $y_t$ is predicted based on the state information $x_t$. $w_t$ denotes an observation noise introduced in order to achieve the object as described above. The observation noise is information that interpolates a difference between information calculated by applying the processing indicated by $h_t$ to the state information $x_t$ and a state that needs to be calculated in order to achieve the object as described above.

The system model (exemplified in Eqn. 1) is, for example, a simultaneous linear equation acquired by discretizing a partial differential equation representing a change related to a system state in accordance with a finite element method and the like, a normalized difference vegetation index, or a simulation model for rice weather relation. The normalized difference vegetation index and the simulation model for rice weather relation will be described later in a second example embodiment. The system model is not limited to the above-described example.

The input model is a model representing a relevance between an input to an actuator and a state (or an output) acquired by processing the input by the actuator, and can be represented by using a mathematical aspect, for example. As described later, the input model is, for example, a model representing a noise related to an actuator, or a model representing a relevance between water pressure and an irrigation amount as described later with reference to Eqn. 7 or Eqn. 8.

In data assimilation, the system model (exemplified in Eqn. 1) and the input model (exemplified in Eqn. 7 or Eqn. 8) may be collectively referred to as a "system model". The observation noise $w_t$ is a difference between a value (or a value resulting from an observation device) calculated in accordance with the observation model (exemplified in Eqn. 2) and observation information. The system noise $v_t$ is a difference between a value $f(x_{t-1})$ calculated in accordance with the system model (exemplified in Eqn. 1) and the state information $x_t$.

An input noise (such as $n_1$) represents a difference between an instruction value (such as $f_1$) for an actuator and a change amount (or an estimation value thereof) caused by executing actuation in a system by the actuator. An example of the input noise is parameters indicating various internal conditions and environmental conditions included in the entire system other than the observation device and, therefore, the parameters may be also considered as the input noise.

A model likelihood represents a fitting degree (or a degree of conformity, a degree of matching) between a prediction result predicted in regard to a system and the observation information $y_t$ acquired by observation of the system. The model likelihood can be calculated in accordance with processing exemplified in Eqn. 3, for example.

$$L(\theta)=\Sigma_{t=1}^T P(y_t|x_{t|t-1},\theta) \quad \text{(Eqn. 3)}.$$

However, "$x_{t|t-1}$" denotes state information calculated in regard to a state at a timing T by performing the processing indicated in Eqn. 1 on the state information $x_{t-1}$. $\theta$ denotes a parameter included in at least any of the system model (exemplified in Eqn. 1), the observation model (exemplified in Eqn. 2), and the input model (exemplified in Eqn. 7 or Eqn. 8). For example, $\theta$ denotes a parameter such as the input noise, the system noise $v_t$, the observation noise $w_t$, and a reflectance IR in a model described later with reference to Eqn. 5. $\Sigma_{t=1}^T$ denotes processing of calculating a sum over timings 1 to T.

In example embodiments below, while referring to data assimilation processing as one example of an analysis technique, processing in an abnormality detection device, processing in a control information generation device, processing in an information processing device, and the like will be described. However, the present invention is not limited to the data assimilation processing. In the data assimilation processing, predetermined processing as described later with reference to FIG. 3 and the like is performed on a simulation and observation information representing actual observation result.

Figure 9:
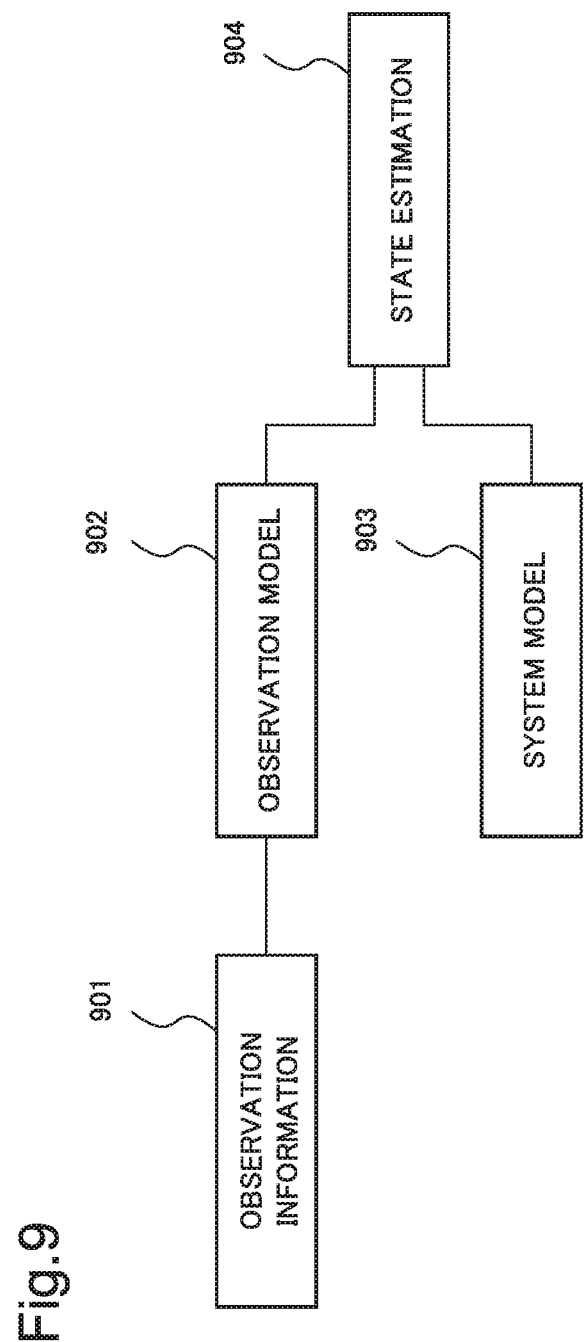
FIG. 9 is a diagram schematically illustrating processing of data assimilation.

Data assimilation will be described with reference to an example illustrated in FIG. 9. FIG. 9 is a diagram schematically illustrating processing of the data assimilation.

The data assimilation is a technique for merging observation information 901 acquired by observation of a system with a system model 903 (exemplified in Eqn. 1) being a mathematical simulation model. The data assimilation includes estimating a system state in accordance with the observation information 901, an observation model 902 (exemplified in Eqn. 2) representing a relevance with the system state, and the system model 903 (exemplified in Eqn. 1) representing the system state. The data assimilation includes estimating a physical state of a system in space time (state estimation 904 in FIG. 9) in accordance with a system model and adjusting an analysis value (prediction result) so as to fit the observation information 901. The system model represents a state of the system that also includes an actuator.

The data assimilation processing is used for estimating a system state. However, there is no example in which the data assimilation processing is applicable to a control system. The inventor of the present application found that the data assimilation processing is applicable to the control system, which leads to the invention of each device as described later.

Next, example embodiments of the present invention will be described in detail with reference to drawings.

First Example Embodiment

A configuration of an abnormality detection device 101 according to a first example embodiment of the present invention will be described in detail with reference to FIG. 1. FIG. 1 is a block diagram illustrating the configuration of the abnormality detection device 101 according to the first example embodiment of the present invention.

The abnormality detection device 101 according to the first example embodiment includes a noise calculation unit (noise calculator) 102 and an abnormality detection unit (abnormality detector) 109. The noise calculation unit 102 includes a data assimilation processing unit (data assimilation processor) 103, a noise adjustment unit (noise adjuster) 107, and a likelihood calculation unit (likelihood calculator) 108.

The abnormality detection device 101 can be communicatively connected to an output device 153. Further, the abnormality detection device 101 can read observation information stored in an observation information storage unit 154 and calculation setting information stored in a calculation setting information storage unit 155. The abnormality detection device 101 may be communicatively connected to an observation device 151 and an input device 152.

The observation device 151 observes a state of a system 201 (described later with reference to FIG. 2), and stores observation information (observation data) representing a result of the observation in the observation information storage unit 154. When the system 201 is a farming system, the observation information is information about, for example, an amount of moisture contained in soil, a reflectance of a ground surface observed by a sensor installed on an artificial satellite, a precipitation amount, a movement amount observed in regard to an operation of an actuator, and the like. The observation information is not limited to the above-described examples. The observation information storage unit 154 stores observation information observed by the observation device 151.

For example, the input device 152 receives an input of calculation setting information used in processing of the abnormality detection device 101 from a user, and stores the input calculation setting information in the calculation setting information storage unit 155. The calculation setting information storage unit 155 can store the calculation setting information input by the input device 152.

The calculation setting information represents information about, for example, a stop determination condition for stopping the data assimilation processing, a predetermined stop determination condition related to whether or not a degree representing a possibility of occurrence is sufficiently great, a monitoring stop condition related to whether or not a predetermined period of time has elapsed, and the like. The calculation setting information is not limited to the above-described examples.

The output device 153 displays a result output from the abnormality detection device 101.

Figure 2:
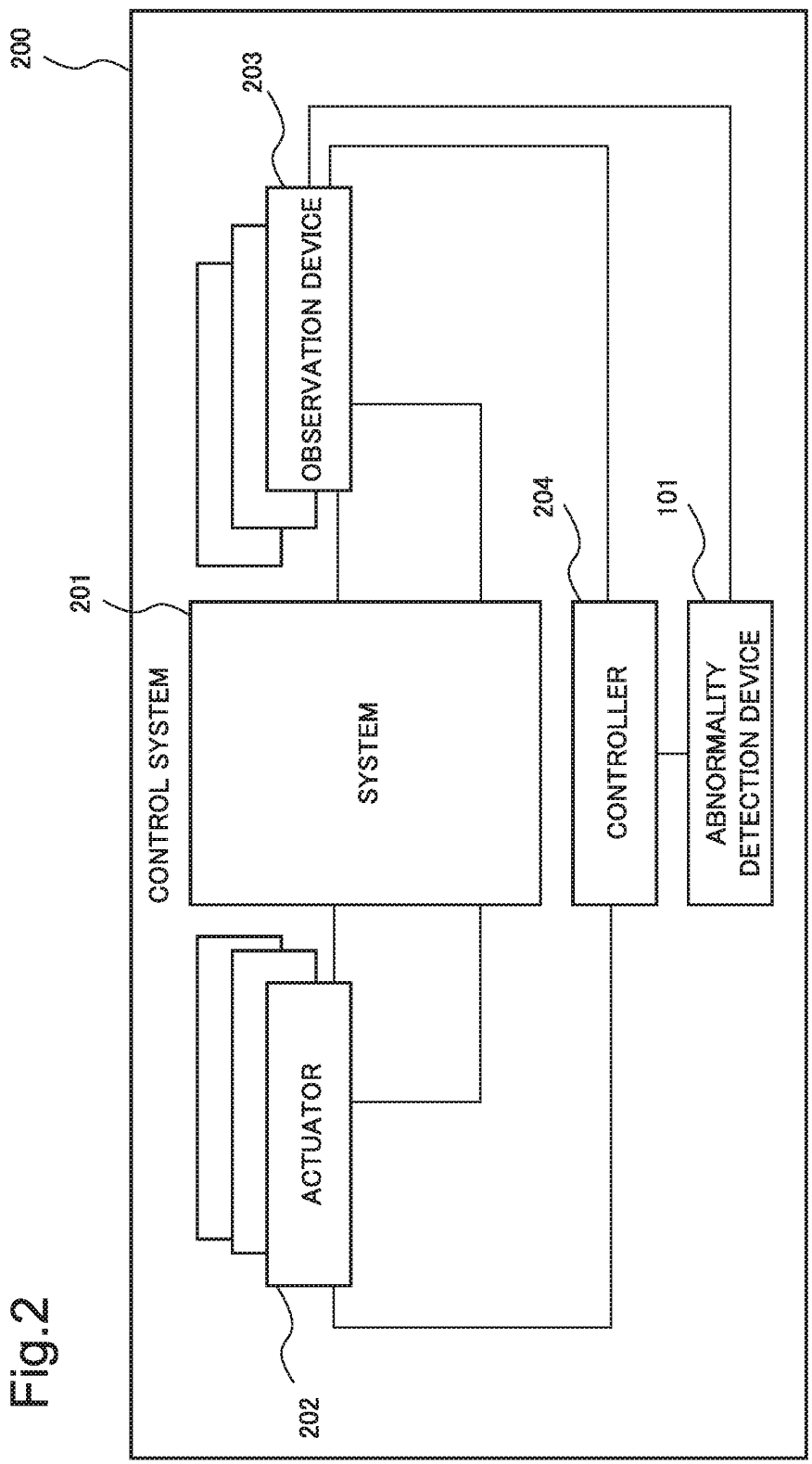
FIG. 2 is a block diagram illustrating a configuration of a control system being one example of a control system that performs control, based on a result output from the abnormality detection device.

Next, one example of a control system 200 that performs control, based on a result output from the abnormality detection device 101, will be described with reference to FIG. 2. FIG. 2 is a block diagram illustrating a configuration of the control system 200 being one example of a control system that performs control, based on a result output from the abnormality detection device 101.

The control system 200 includes the system 201, an actuator 202, an observation device 203, a controller 204, and the abnormality detection device 101.

The system 201 is a system being a target for actuation executed by the actuator 202. The system 201 is, for example, a farming system as described later, a control system that controls an aircraft, and a control system that controls an attitude of an artificial satellite. The system 201 is not limited to the above-described examples.

The actuator 202 executes actuation in the system 201 in accordance with a control signal transmitted from the controller 204. When the system 201 is a farming system, the actuator 202 is, for example, an irrigation pump or a pivot used in irrigation. When the system 201 is an attitude of an artificial satellite, the actuator 202 is, for example, a thruster that controls the attitude of the artificial satellite. In the control system 200, the actuator 202 is not limited to one device, and may be a plurality of devices having a certain function or a plurality of devices having functions different from each other. The actuator 202 is not limited to the above-described examples.

The observation device 203 monitors a state of the system 201. When the system 201 is a farming system, the observation device 203 is, for example, a sensor for observing a precipitation amount in a field, a moisture sensor for observing an amount of moisture contained in soil in the field, and a thermometer for observing a temperature near the field. The observation device 203 has a function similar to the function of the observation device 151 in FIG. 1. The observation device 203 is not limited to the above-described example.

The abnormality detection device 101 outputs, to the controller 204, a result of calculation in accordance with processing described later with reference to FIG. 3. The controller 204 generates a control signal representing a content for controlling the actuator 202 based on the result output from the abnormality detection device 101 and transmits the generated control signal to the controller 204.

In the control system 200, for example, control is performed in accordance with PID control. PID represents an abbreviation for Proportional Integral Differential. In the PID control, the controller 204 controls a manipulation amount for the actuator 202 in accordance with magnitude of a value referred to as a control gain (for example, a result output from the abnormality detection device 101). In other words, the control gain is information about a numerical value and the like representing an extent (degree) of controlling a manipulation amount of the actuator 202. The controller 204 calculates a manipulation amount for the actuator 202 based on a difference between a manipulation amount related to control of the actuator 202 and an operation amount executed by the actuator 202 and based on the control gain, for example. A manipulation amount related to a specific actuator in the actuator 202 can be increased by setting a great value to the control gain. A manipulation amount related to a specific actuator in the actuator 202 can be reduced by setting a small value to the control gain.

The manipulation amount is referred as an example for description in the above-described description, but the manipulation amount may be force (action amount) that acts on a system. In other words, the control gain is not limited to the above-described example.

A configuration of the noise calculation unit 102 will be described further in detail with reference to FIG. 1.

The noise calculation unit 102 includes the data assimilation processing unit 103, the noise adjustment unit 107, and the likelihood calculation unit 108.

The data assimilation processing unit 103 reads observation information stored in the observation information storage unit 154 and calculation setting information stored in the calculation setting information storage unit 155. The data assimilation processing unit 103 predicts a state of the system 201 by performing, on the read information, data assimilation processing of applying processing indicated by a system model 105 (exemplified in Eqn. 1) and an observation model 104 (exemplified in Eqn. 2), and the like.

The likelihood calculation unit 108 applies a model likelihood (exemplified in Eqn. 3) to the state predicted by the data assimilation processing unit 103. By the processing, the likelihood calculation unit 108 calculates a degree that state information representing the state predicted by the data assimilation processing unit 103 matches (conforms to, is suitable for, coincides with) observation information acquired by observation of the system 201.

The noise adjustment unit 107 adjusts a system noise $v_t$ constituting the system model 105 (exemplified in Eqn. 1), an observation noise $w_t$ constituting the observation model 104 (exemplified in Eqn. 2), and an input noise, based on the degree calculated by the likelihood calculation unit 108. Herein, the input noise is, for example, a noise representing a difference between a manipulation amount (for example, a target amount of an operation of the actuator 202) instructed to the actuator 202 and an operation amount observed by the observation device 203. The noise adjustment unit 107 calculates a system noise, an observation noise, and an input noise such that the degree calculated by the likelihood calculation unit 108 satisfies a predetermined calculation condition. The predetermined calculation condition is, for example, a condition that state information representing a predicted state is the most suitable for observation information. The predetermined calculation condition may not necessarily be a condition that the degree is maximum. The predetermined calculation condition may be a condition that the degree is greater than a predetermined threshold value.

The noise calculation unit 102 may have a function of reading observation information stored in the observation information storage unit 154 and calculation setting information stored in the calculation setting information storage unit 155.

The data assimilation processing unit 103 further inputs an input noise. The data assimilation processing unit 103 calculates a state of the system 201 in accordance with the processing indicated by the system model 105 (exemplified in Eqn. 1). The data assimilation processing unit 103 generates state information representing a state of the system 201 (for example, a state observed by the observation device 203) by performing the processing indicated by the observation model 104 (exemplified in Eqn. 2) on the calculated state. By performing the data assimilation processing, the data assimilation processing unit 103 outputs, as a result, a difference between state information representing a state of a system model, which is calculated by assuming each noise, and observation information observed by the observation device 203, for example.

The likelihood calculation unit 108 inputs the prediction result predicted by the data assimilation processing unit 103, and applies the processing indicated by the model likelihood (exemplified in Eqn. 3) to the input prediction result. By the processing, the likelihood calculation unit 108 calculates a degree of suitability between the state information generated in regard to the system 201 and the observation information (observation information) acquired by observation of the system 201. The likelihood calculation unit 108 outputs the calculated degree to the noise adjustment unit 107.

The noise adjustment unit 107 inputs the degree output from the likelihood calculation unit 108, calculates a system noise, an observation noise, and an input noise, based on the input degree, and outputs the calculated noise to the data assimilation processing unit 103. The noise adjustment unit 107 calculates a system noise, an observation noise, and an input noise such that, for example, the state information generated in regard to the system 201 is the most suitable for the observation information (observation information) acquired by observation of the system 201.

Therefore, the noise calculation unit 102 calculates a noise such that the model likelihood (exemplified in Eqn. 3) is the greatest value (that is, it is estimated that a degree of suitability is the highest), and outputs the calculated noise to the abnormality detection unit 109.

The abnormality detection unit 109 inputs the noise (that is, the system noise, the observation noise, and the input noise) output from the noise calculation unit 102. The abnormality detection unit 109 determines that an abnormality occurs in the actuator 202 when, for example, the noise satisfies a predetermined determination condition that the noise is a value greater than a threshold value, and the like. Alternatively, the abnormality detection unit 109 may calculate a moving distribution of the noise with respect to a lapse of time. The moving distribution represents a distribution of noise in a predetermined period. The abnormality detection unit 109 may determine that an abnormality occurs in the actuator 202 when the moving distribution satisfies a predetermined determination condition that the moving distribution is a value greater than a threshold value, and the like. The abnormality detection unit 109 outputs information representing a result of the determination to the output device 153. The distribution may be a degree that a certain value is distributed, and is not limited to a mathematically defined variance. For example, the degree of distribution is calculated by a difference between a maximum value of a noise in a predetermined period and a minimum value of the noise in the predetermined period.

Next, processing in the abnormality detection device 101 according to the first example embodiment of the present invention will be described in detail with reference to FIG. 3. FIG. 3 is a flowchart illustrating a flow of the processing in the abnormality detection device 101 according to the first example embodiment.

As described above, the observation information storage unit 154 stores observation information (observation data) observed by the observation device 203 for observing the system 201 (FIG. 2). The calculation setting information storage unit 155 stores calculation setting information (calculation setting data) input by using the input device 152. The calculation setting information is information about a stop determination condition representing a reference for determining processing of adjusting a noise, a threshold value representing a reference for detecting an abnormality of the actuator 202, a given period representing a period during which the data assimilation processing is performed, a time interval for monitoring whether or not the abnormality occurs, and the like.

The noise calculation unit 102 reads observation information stored in the observation information storage unit 154 (Step S101). The noise calculation unit 102 reads calculation setting information stored in the calculation setting information storage unit 155 (Step S102).

In the noise calculation unit 102, the data assimilation processing unit 103 further reads an initial value of an observation noise in the observation model 104, an initial value of a system noise in the system model 105, and an initial value of an input noise in an input model 106 (Step S103). These initial values may be a previously calculated noise (for example, a noise at a previous timing), or may be a predetermined value.

The data assimilation processing unit 103 predicts a state of the system 201 by applying, on the input information, at least any processing of the processing indicated by the system model 105 (exemplified in Eqn. 1) and the processing indicated by input model 106. In other words, the data assimilation processing unit 103 predicts a state of a system by using observation information acquired by observation of a system subjected to action by the actuator 202 and a model related to a state of the system (performs data assimilation processing) and, thereby, predicts a state of the system 201 (Step S104).

The data assimilation processing unit 103 determines whether or not prediction processing for a given period included in the read calculation setting information is completed (Step S105). When the prediction processing for the given period is not completed (NO in Step S105), the data assimilation processing unit 103 proceeds the timing to a next timing (Step S106), and performs the processing indicated in Step S101 to Step S105 for the next timing.

The likelihood calculation unit 108 inputs the state predicted by the data assimilation processing unit 103, and calculates a degree of suitability between state information representing the state and the observation information stored in the observation information storage unit 154 in accordance with processing indicated by the model likelihood (exemplified in Eqn. 3) (Step S107). The likelihood calculation unit 108 performs processing of calculating the above-described degree in regard to each timing included in the given period. The likelihood calculation unit 108 determines whether or not a predetermined stop determination condition is satisfied (Step S108). The predetermined stop determination condition represents a condition for determining whether or not the data assimilation processing is terminated, such as a condition that the calculated degree is greater than a predetermined threshold value. The predetermined stop determination condition may be a condition that the calculated degree is a value greater than the smallest value (that is, a likelihood when it is estimated that a possibility of occurrence is low) among model likelihood values included in the calculation setting information. In other words, the smallest value is a threshold value in the predetermined stop determination condition. Alternatively, the predetermined stop determination condition may be a condition that the highest model likelihood is calculated in a search space related to a noise.

When the degree does not satisfy the stop determination condition (NO in Step S108), the noise adjustment unit 107 calculates a system noise, an observation noise, and an input noise, based on the degree calculated by the likelihood calculation unit 108 (Step S109). The noise adjustment unit 107 calculates a system noise, an observation noise, and an input noise such that, for example, a degree of suitability between state information representing a predicted state and observation information is maximum.

The noise adjustment unit 107 calculates, based on the model likelihood (exemplified in Eqn. 3) calculated by the likelihood calculation unit 108, a noise such that the model likelihood is the greatest value (that is, a possibility of occurrence is high), and outputs the calculated noise to the data assimilation processing unit 103. The noise adjustment unit 107 calculates a noise such that a possibility of occurrence is high in accordance with a gradient descent method with the model likelihood as an objective function, for example. More specifically, the noise adjustment unit 107 acquires a degree (for example, an inclination) that the model likelihood changes when each noise included in the model likelihood changes, and calculates an amount of change in each noise when the degree is the greatest value (that is, the degree is the greatest).

When the degree satisfies the stop determination condition (YES in Step S108), the noise adjustment unit 107 outputs the calculated input noise to the abnormality detection unit 109.

The abnormality detection unit 109 inputs the input noise output from the noise adjustment unit 107, and determines whether or not an abnormality of the actuator 202 occurs based on whether or not the input noise satisfies a predetermined determination condition (Step S110). The predetermined determination condition is, for example, a condition that the input noise exceeds a predetermined threshold value. The predetermined determination condition is, for example, a condition that a moving distribution of the input noise is increased. The predetermined determination condition is not limited to the above-described examples.

In Step S110, the abnormality detection unit 109 may calculate a timing at which the input noise exceeds the predetermined threshold value based on a state where the input noise changes toward a time transition, instead of the above-described processing. In this case, the abnormality detection device 101 according to the present example embodiment can determine a timing at which an abnormality of the actuator 202 occurs before the abnormality occurs.

The abnormality detection unit 109 outputs, to the output device 153, information representing whether or not the abnormality of the actuator 202 occurs or information representing a timing at which the abnormality of the actuator 202 occurs (Step S111).

The abnormality detection unit 109 may predict, based on a degree of change related to an input noise for an actuator, for example, a timing at which the degree exceeds the threshold value, and output the predicted timing to the output device 153. In this case, the abnormality detection unit 109 can predict the timing at which an abnormality of the actuator occurs.

When a monitoring stop condition stored in the calculation setting information storage unit 155 is satisfied (for example, when an abnormality monitoring time interval of time has actually elapsed) (YES in Step S112), the abnormality detection unit 109 terminates the processing as described above with reference to FIG. 3. When the monitoring stop condition is not satisfied (NO in Step S112), the abnormality detection unit 109 performs the processing as described above with reference to FIG. 3 in regard to a next timing. The monitoring stop condition is, for example, a condition that 100 days have elapsed since monitoring related to an actuator has started, and the like.

Next, an advantageous effect of the abnormality detection device 101 according to the first example embodiment of the present invention will be described.

The abnormality detection device 101 according to the first example embodiment can provide information being a basis for early detection of an abnormality of device. A reason for this is that a noise calculated in regard to the device by the abnormality detection device 101 is related to an abnormality of the device. As described above, the noise is, for example, an input noise included in the input model 106. In other words, the input noise represents, for example, a difference between a manipulation amount instructed to a device such as the actuator 202 (FIG. 2) and an operation amount performed by the device in accordance with the instruction. For example, as this difference is a greater value, the device does not perform the instructed manipulation amount. Alternatively, as a temporal change in this difference is greater, it is indicated that the device is in an unstable state. Therefore, the difference represents information being a basis for early detection of an abnormality of the device (for example, the actuator 202). Therefore, the abnormality detection device 101 can provide the information being the basis for early detection of the abnormality of the device.

Furthermore, the abnormality detection device 101 according to the present example embodiment can detect an abnormality of a device at an early stage. A reason for this is that, when a noise related to a device satisfies a predetermined determination condition, the abnormality detection device 101 determines that an abnormality occurs in the device. For example, when a noise related to a device is a value greater than a predetermined threshold value, the abnormality detection device 101 determines that an abnormality occurs in the device. This indicates that, when the noise is great, for example, a disparity between a manipulation amount instructed to the device and an operation amount performed by the device in accordance with the instruction is great. For example, when a temporal change of the difference related to a device is a value greater than a predetermined threshold value, the abnormality detection device 101 determines that an abnormality of the device occurs. This indicates that, when a fluctuation in the difference is great, a state of the device is unstable.

Second Example Embodiment

Next, a second example embodiment of the present invention will be described.

Figure 4:
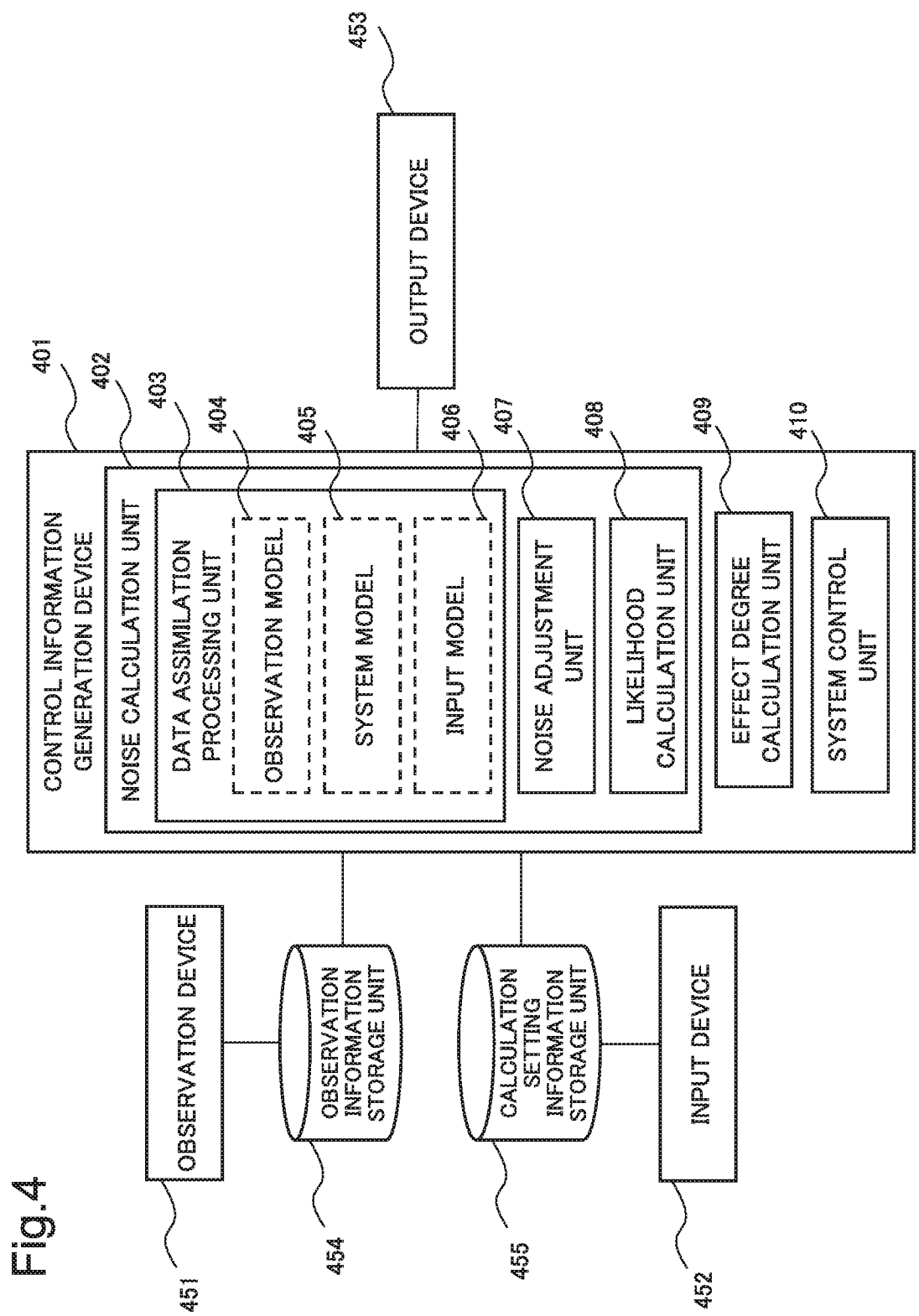
FIG. 4 is a block diagram illustrating a configuration of a control information generation device according to a second example embodiment of the present invention.

A configuration of a control information generation device 401 according to the second example embodiment of the present invention will be described in detail with reference to FIG. 4. FIG. 4 is a block diagram illustrating a configuration of the control information generation device 401 according to the second example embodiment of the present invention.

The control information generation device 401 according to the second example embodiment includes a noise calculation unit (noise calculator) 402, an effect degree calculation unit (effect degree calculator) 409, and a system control unit (system controller) 410. The noise calculation unit 402 includes a data assimilation processing unit (data assimilation processor) 403, a noise adjustment unit (noise adjuster) 407, and a likelihood calculation unit (likelihood calculator) 408.

The data assimilation processing unit 403 has a function similar to the function of the data assimilation processing unit 103 (FIG. 1). The noise adjustment unit 407 has a function similar to the function of the noise adjustment unit 107 (FIG. 1). The likelihood calculation unit 408 has a function similar to the function of the likelihood calculation unit 108 (FIG. 1). Therefore, the data assimilation processing unit 403 has a function similar to the function of the data assimilation processing unit 103 (FIG. 1). Herein, detailed description related to these components will be omitted.

The control information generation device 401 can be communicatively connected to an output device 453. Further, the control information generation device 401 can read information stored in an observation information storage unit 454 and information stored in a calculation setting information storage unit 455. The control information generation device 401 may be communicatively connected to an observation device 451 and an input device 452.

The observation device 451 has a function similar to the function of the observation device 151 (FIG. 1). The input device 452 has a function similar to the function of the input device 152 (FIG. 1). The output device 453 has a function similar to the function of the output device 153 (FIG. 1). The observation information storage unit 454 has a function similar to the function of the observation information storage unit 154 (FIG. 1). The calculation setting information storage unit 455 has a function similar to the function of the calculation setting information storage unit 155 (FIG. 1). Herein, detailed description related to these components will be omitted.

Figure 5:
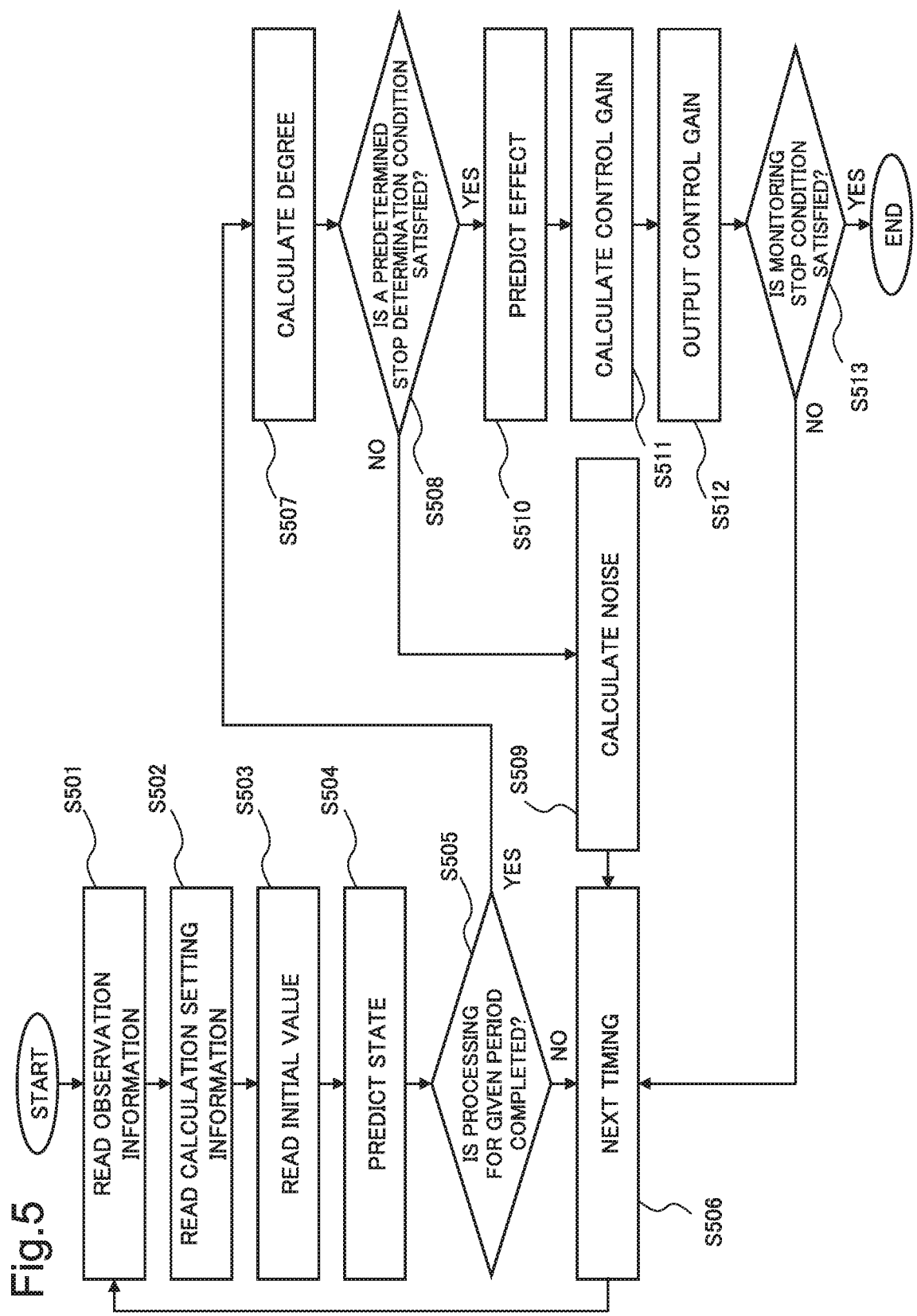
FIG. 5 is a flowchart illustrating a flow of processing in the control information generation device according to the second example embodiment.

Next, processing in the control information generation device 401 according to the second example embodiment of the present invention will be described in detail with reference to FIG. 5. FIG. 5 is a flowchart illustrating a flow of the processing in the control information generation device 401 according to the second example embodiment.

Figure 3:
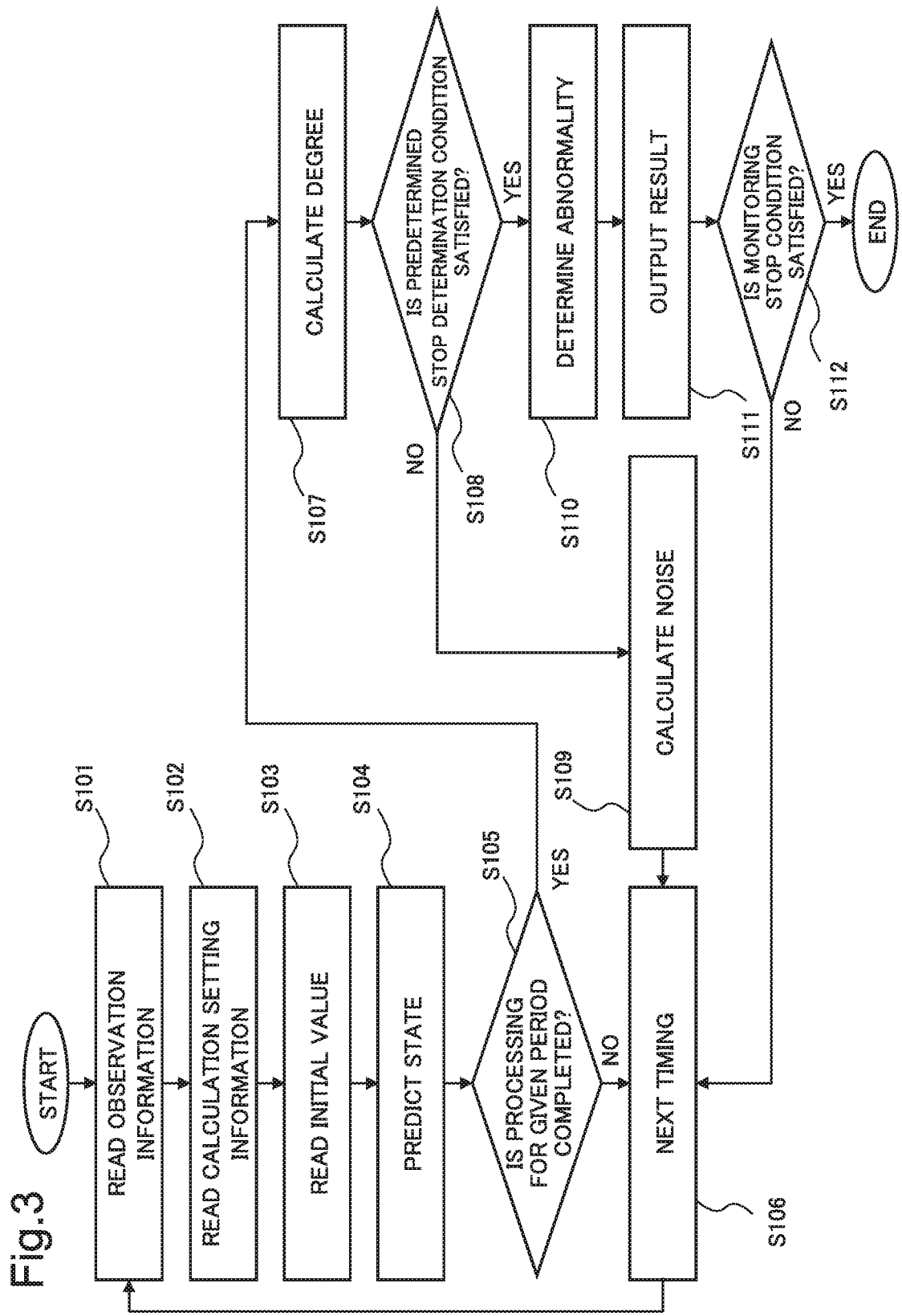
FIG. 3 is a flowchart illustrating a flow of processing in the abnormality detection device according to the first example embodiment.

Of processing steps illustrated in FIG. 5, processing indicated in Step S501 to Step S509 is processing similar to that in Step S101 to Step S109 in FIG. 3, respectively. Therefore, in the present example embodiment, detailed description related to the processing indicated in Step S501 to Step S509 will be omitted.

When a predetermined stop determination condition related to data assimilation processing is satisfied (YES in Step S508), the effect degree calculation unit 409 predicts an effect of an input noise for each actuator in the system 201 (FIG. 2) in accordance with a system model 405 (exemplified in Eqn. 1) and an input model 406 (Step S510). For example, the effect degree calculation unit 409 predicts that there is a possibility that performance of the system 201 is decreased due to an actuator in a state where an input noise increases.

The system control unit 410 calculates a control gain to be changed, based on the input noise, an observation model 404, the system model 405, and the input model 406 (Step S511), and outputs the calculated control gain to the controller 204 (FIG. 2) (Step S512). The system control unit 410 calculates a control gain in accordance with magnitude of the input noise (namely, a difference related to the input model 406). The system control unit 410 calculates a control gain in accordance with, for example, a predetermined relevance with that a control gain decreases (that is, a manipulation amount is smaller) as a difference becomes a greater value. Alternatively, the system control unit 410 may adjust a control gain in accordance with a change in difference with respect to a lapse of time in regard to a certain device, for example. In this case, the system control unit 410 calculates a value acquired by decreasing the control gain (that is, reducing the manipulation amount) when the difference increases with a lapse of time. The system control unit 410 calculates a value acquired by increasing the control gain (that is, increasing the manipulation amount) when the difference decreases. Processing of calculating a control gain will be specifically described with reference to FIG. 2.

For example, actuators 202 (FIG. 2) are assumed to be a first actuator and a second actuator. Processing of calculating a control gain by the system control unit 410 will be described with reference to an example in which the actuator 202 adds a total of 2×f (f≥0) force to a system (represented as the "system 201" for the sake of convenience).

For convenience of description, an input noise $n_1$ ($n_1>0$) related to the first actuator is assumed to be proportional to a force $f_1$ ($f_1>0$) added by the first actuator (that is, $n_1=\alpha_1 \times f_1$). An input noise $n_2$ ($n_2>0$) related to the second actuator is assumed to be proportional to a square of a force $f_2$ ($f_2>0$) added by the second actuator (that is, $n_2=\alpha_2 \times f_2^2$). It is assumed that the actuator 202 adds equivalent force to the system 201 at an initial timing (that is, $f=f_1=f_2$). Furthermore, it is assumed that it is detected at a timing T that a noise related to the first actuator becomes k ($=\gamma_1 \div \alpha_1$, $\gamma_1$ denotes a new coefficient $\alpha_1$) times greater (k>0). This indicates that, when the force $f_1$ added by the first actuator is constant, the coefficient $\alpha_1$ becomes k times greater at the timing T. In this case, when the first actuator adds β (β>0)-fold force at the timing T while a total of force added to the system 201 by the actuator 202 is maintained at 2×f, a noise N related to the total of the force added by the actuator 202 can be calculated in accordance with processing indicated by Eqn. 4.

$$N=\sqrt{\beta^2\gamma_1^2 f^2+(2-\beta)^4\alpha_2^2 f^4}$$ (Eqn. 4)

However, $\gamma_1$ denotes the new coefficient $\alpha_1$ related to the first actuator.

The system control unit 410 calculates β such that the noise N (exemplified in Eqn. 4) related to the total of the force is minimum. In other words, the system control unit 410 calculates a degree that a force of the first actuator is controlled when the noise N (exemplified in Eqn. 4) related to the input total of the force is minimum. In this case, the force $f_1$ applied to the system 201 by the first actuator is "β×f" in relation to the noise N (exemplified in Eqn. 4). Further, in this case, the force $f_2$ applied to the system 201 by the second actuator is "(2−β)×f" in relation to the noise N (exemplified in Eqn. 4).

The system control unit 410 calculates, as a new control gain, a value acquired by multiplying a control gain related to the first actuator by β times, for example. Further, the system control unit 410 calculates, as a new control gain, a value acquired by multiplying a control gain related to the second actuator by (2−β) times, for example. When a force applied by an actuator increases, the system control unit 410 increases a control gain related to the actuator. When a force applied by an actuator decreases, the system control unit 410 reduces a control gain related to the actuator.

As described above, the noise N (exemplified in Eqn. 4) related to the total of the force applied to the system 201 is minimum by determining each control gain, and thus control of the system 201 can be stably maintained.

Next, the noise calculation unit 402 may wait until an adjustment time included in calculation setting information actually elapses. The adjustment time is, for example, a time until a time corresponding to a period simulated in the data assimilation processing actually elapses. The noise calculation unit 402 determines whether or not a monitoring stop condition input to the calculation setting information is satisfied (Step S513). When the monitoring stop condition is satisfied (YES in Step S513), the noise calculation unit 402 terminates the processing illustrated in FIG. 5. When the monitoring stop condition is not satisfied (NO in Step S513), a timing related to the data assimilation processing proceeds to a next timing (Step S506). Subsequently, the processing indicated in Step S501 is performed. The monitoring stop condition is, for example, a condition that 100 days have elapsed since control of the system 201 has started, and the like.

The control information generation device 401 according to the present example embodiment can detect an abnormality of the actuator 202 while stably maintaining the system 201 (FIG. 2).

The control information generation device 401 may generate information for controlling the actuator 202 and further determine whether or not an abnormality of the actuator 202 occurs similarly to the processing in the abnormality detection device 101 (FIG. 1).

Next, processing in the abnormality detection device 101 according to the first example embodiment and processing in the control information generation device 401 according to the second example embodiment will be each described with reference to an example in which the system 201 (FIG. 2) is a farming system.

First, the processing in the abnormality detection device 101 (FIG. 1) will be described with reference to an example in which the abnormality detection device 101 according to the first example embodiment is applied to a farming system. In this case, the system 201 (FIG. 2) is the farming system related to a field in which a crop is cultivated. Control in the farming system represents, for example, an operation (manipulation) of maintaining the amount of moisture necessary for the crop in a proper quantity by irrigating the field in which the crop is cultivated.

The observation device 151 is, for example, an observation device such as a sensor for measuring the amount of moisture contained in soil in a field, a leaf area index sensor related to a crop, a plant height sensor, a sensor for measuring a nitrogen concentration in a leaf, and a sensor installed on an artificial satellite. Each of the observation devices observes a field or a crop cultivated in the field, and stores observation information representing a result of the observation in the observation information storage unit 154.

The observation model 104 (exemplified in Eqn. 2) is a model capable of predicting observation information measured by the observation device 151. In the farming system, the observation model 104 (exemplified in Eqn. 2) is, for example, a normalized difference vegetation index (NDVI) representing a distribution situation of vegetation and an activity ratio of the vegetation. NDVI represents an abbreviation for Normalized difference vegetation index. NDVI is calculated in accordance with processing indicated by Eqn. 5 based on reflectance R in a visible range red and reflectance IR of a near infrared range. Such reflectance I and IR are observed by a sensor installed on an artificial satellite in regard to the vicinity of a field.

$$NDVI = (IR - R) \div (IR + R) \tag{Eqn. 5}$$

NDVI indicates dense vegetation with a greater positive value.

In the farming system, the system model 105 (exemplified in Eqn. 1) is, for example, a crop growth model for simulation of crop growth. The system model 105 is, for example, a simulation model for rice weather relation (SIMRIW), and the like. SIMRIW is an abbreviation for SImulation Model for RIce Weather relations. In the simulation model for rice weather relation, an increasing rate dLAI of a leaf area index is one example of an index representing an aspect in which a crop grows every day. LAI is an abbreviation of Leaf Area Index. The increasing rate dLAI of the leaf area index is calculated by applying processing indicated by Eqn. 6 to a temperature Te, a precipitation amount r, an insolation duration ts, an absorbable nitrogen amount Ni in soil, and an irrigation amount w.

$$dLAI = dLAI(Te, r, ts, Ni, w) \tag{Eqn. 6}$$

In a field, for example, irrigation using an irrigation pipe is performed. In the irrigation, water transmitted from an irrigation pump is supplied to the field via the irrigation pipe, and the irrigation is performed on soil in the field with the supplied water. The irrigation pipe has a hole (hereinafter represented as a "pipe hole") for discharging water in a side surface. The soil is irrigated with the water discharged from the pipe hole. In a case of such irrigation, the input model 106 is, for example, a model representing a relevance between pressure of water transmitted from an irrigation pump installed in the field and an irrigation amount of irrigation with the transmitted water. When a first actuator is the irrigation pipe, an irrigation amount W1 of irrigation by the irrigation pipe can be calculated in accordance with processing indicated by Eqn. 7 based on a hole diameter d1 of the pipe hole, pressure P1 of water transmitted from the irrigation pump, and an irrigation time t1.

$$W1 = \alpha \times P1 \times t1 \times d1^2 \tag{Eqn. 7}$$

Here, $\alpha$ is positive.

Further, when a second actuator is a pivot used in irrigation, an irrigation amount W2 when the field is irrigated by using the pivot is calculated in accordance with processing as indicated by Eqn. 8, based on a diameter d2 of a water discharge hole of the pivot, pressure P2 of water transmitted from a pump connected to the pivot, a wind velocity v around the pivot, and the number of rotations n of the pivot.

$$W2 = \beta \times P2 \times n \times d2^2 \div v \tag{Eqn. 8}$$

Here, $\beta$ is positive.

In the data assimilation processing, the input model 106 may be included in the system model 105 (exemplified in Eqn. 1). However, in the present example embodiment, the input model 106 is processed separately from the system model 105 (exemplified in Eqn. 1). As a result, the noise calculation unit 102 according to the present example embodiment calculates a prediction result such as a state of the system 201 by performing the data assimilation processing as described above, based on observation information, the observation model 104 (exemplified in Eqn. 2), the system model 105 (exemplified in Eqn. 1), and the input model 106 (exemplified in Eqn. 7 or Eqn. 8). The noise calculation unit 102 calculates a model likelihood (exemplified in Eqn. 3) in accordance with an observation noise related to the observation model 104, a system noise related to the system model 105, and an input noise related to the input model 106, based on the calculated prediction result.

For example, the noise calculation unit 102 calculates a model likelihood (exemplified in Eqn. 3) for each of a plurality of noises, and calculates, as an optimum noise, a noise in which the model likelihood is the highest (that is, the model likelihood is a prediction result closest to observation information acquired by observation).

For convenience of description, when a model likelihood (exemplified in Eqn. 3) is the highest, it is assumed that the input noise $n_1$ related to the irrigation pipe is 0.3 millimeters (mm), and the input noise $n_2$ related to the pivot is 0.6 (mm). In other words, it is assumed that the noise calculation unit 102 calculates the two noises described above as noises such that the model likelihood is the highest.

In this case, the input noise $n_2$ related to the pivot is a value greater than the input noise $n_1$ related to the irrigation pipe, and thus a disparity from an estimation value is greater in the pivot than the irrigation pipe. A noise often increases with a lapse of time in a process of a failure of a device such as the actuator 202, and thus the pivot is more likely to be faulty than the irrigation pipe in accordance with the noise. In this case, irrigation in a predicted irrigation amount is less likely to be performed in irrigation using the pivot than irrigation using the irrigation pipe in accordance with the noise.

The noise calculation unit 102 determines whether or not an abnormality (or a failure) of an actuator occurs, based on whether or not a noise related to the actuator exceeds a predetermined threshold value. In the farming system, the abnormality is, for example, an abnormality of a pipe hole, an abnormality of an irrigation pump connected to an irrigation pipe, and the like. For example, the noise calculation unit 102 calculates a rate of an increase of the input noise with a lapse of time (for example, each day), and calculates a timing at which the noise exceeds a predetermined threshold value when the input noise increases at the calculated rate. By such processing, the noise calculation unit 102 can predict the timing at which an abnormality (or a failure) of the actuator occurs.

For example, when the input noise $n_1$ related to the irrigation pipe increases every day, and then exceeds a predetermined threshold value, the abnormality detection device 101 determines that an abnormality occurs in the irrigation pipe. In this case, when the abnormality detection device 101 determines that an abnormality of the irrigation pipe occurs, for example, it can be estimated that the abnormality of the actuator such as a pipe hole and an irrigation pump occurs.

Next, the processing in the control information generation device 401 will be described with reference to an example in which the control information generation device 401 according to the second example embodiment is applied to a farming system.

When the input noise $n_1$ related to an irrigation pipe increases with a lapse of time (for example, each day), the effect degree calculation unit 409 predicts that an effect degree on an irrigation amount of the entire system 201 (FIG. 2) becomes stronger by an error of the irrigation amount in a case of irrigation using an irrigation pipe than an error of the irrigation amount in a case of irrigation using a pivot. In this case, the system control unit 410 adjusts a control gain related to the pivot in such a way as to increase the irrigation using the pivot. On the other hand, the system control unit 410 adjusts a control gain related to the irrigation pipe in such a way as to reduce the irrigation using the irrigation pipe. Therefore, the controller 204 performs control in such a way as to increase the irrigation using the pivot and reduce the irrigation using the irrigation pipe in accordance with the control gains calculated by the control information generation device 401.

Therefore, the control information generation device 401 according to the present example embodiment can stably irrigate a field even when performance of an irrigation pipe deteriorates. A reason for this is that the control information generation device 401 according to the present example embodiment calculates an error that occurs when the performance deteriorates, and performs control, when the effect degree becomes stronger, in such a way as to reduce irrigation using the irrigation pipe and further increase irrigation using the pivot.

Further, when a plurality of irrigation pipes are installed in a field and a pump for transmitting water is installed on each of the irrigation pipes, the effect degree calculation unit 409 may calculate each noise related to an irrigation amount using the irrigation pipe. In this case, for example, the effect degree calculation unit 409 adjusts control gains in such a way as to reduce a control gain related to the irrigation pipe having a great error of the irrigation amount, and, on the other hand, increase a control gain related to the irrigation pipe having a small error of the irrigation amount, and the like. Therefore, in the system, the controller performs control in such a way as to increase irrigation using an irrigation pipe having a small error and reduce irrigation using an irrigation pipe having a great error. The control information generation device 401 according to the present example embodiment can stably irrigate a field (that is, the system 201) even when performance of an irrigation pipe deteriorates.

Further, the processing in the abnormality detection device 101 according to the first example embodiment and in the control information generation device 401 according to the second example embodiment is described with reference to the example in which the system 201 is the farming system, but the system 201 is not limited to the farming system. The abnormality detection device 101 or the control information generation device 401 is also applicable to control of a system that controls an attitude of an artificial satellite, based on observation information acquired by observation by the observation device 203. In this case, the observation device 203 represents a device such as a GPS signal, a gyro sensor, an acceleration sensor, and a sidereal sensor, for example. In this case, the actuator 202 is a thruster. GPS is an abbreviation of Global Positioning System. In this case, even when a thruster that is particularly difficult to inspect is inspected, an abnormality that occurs in the thruster can be determined based on observation information acquired by observation by using an observation device.

Further, the abnormality detection device 101 or the control information generation device 401 is also applicable to a control system that controls an aircraft. In the control system, the actuator 202 is an engine. In this case, the abnormality detection device 101 or the control information generation device 401 can detect or predict an abnormality of each slat, a flap, a rudder, and the like being the observation device 203.

Next, an advantageous effect related to the control information generation device 401 according to the second example embodiment of the present invention will be described.

The control information generation device 401 according to the second example embodiment can provide information being a basis for early detection of an abnormality of a device. A reason for this is similar to the reason described in the first example embodiment.

Furthermore, the control information generation device 401 according to the second example embodiment can stably maintain the system 201. A reason for this is that the control information generation device 401 generates information being a basis for control. The controller 204 (FIG. 2) controls the actuator 202, based on the information generated by the control information generation device 401. For example, the control information generation device 401 generates information that reduces a manipulation amount of the actuator 202 whose operation is determined to be unstable, and, on the other hand, generates information that increases a manipulation amount of the actuator 202 whose operation is determined to be stable. Therefore, the control information generation device 401 can stably maintain the system 201.

Third Example Embodiment

Next, a third example embodiment of the present invention will be described.

Figure 6:
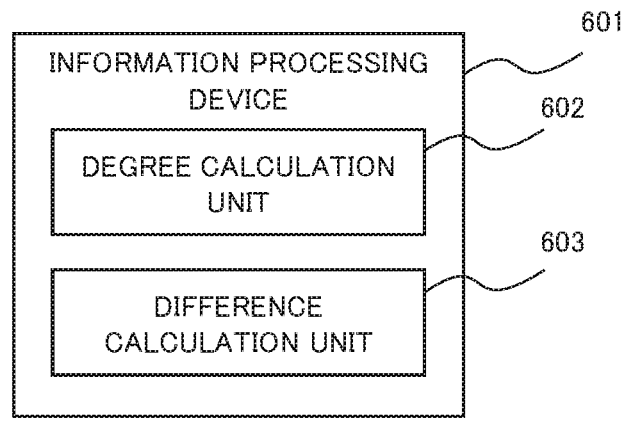
FIG. 6 is a block diagram illustrating a configuration of an information processing device according to a third example embodiment of the present invention.

A configuration of an information processing device 601 according to the third example embodiment of the present invention will be described in detail with reference to FIG. 6. FIG. 6 is a block diagram illustrating the configuration of the information processing device 601 according to the third example embodiment of the present invention.

The information processing device 601 according to the third example embodiment includes a degree calculation unit (degree calculator) 602 and a difference calculation unit (difference calculator) 603.

Figure 7:
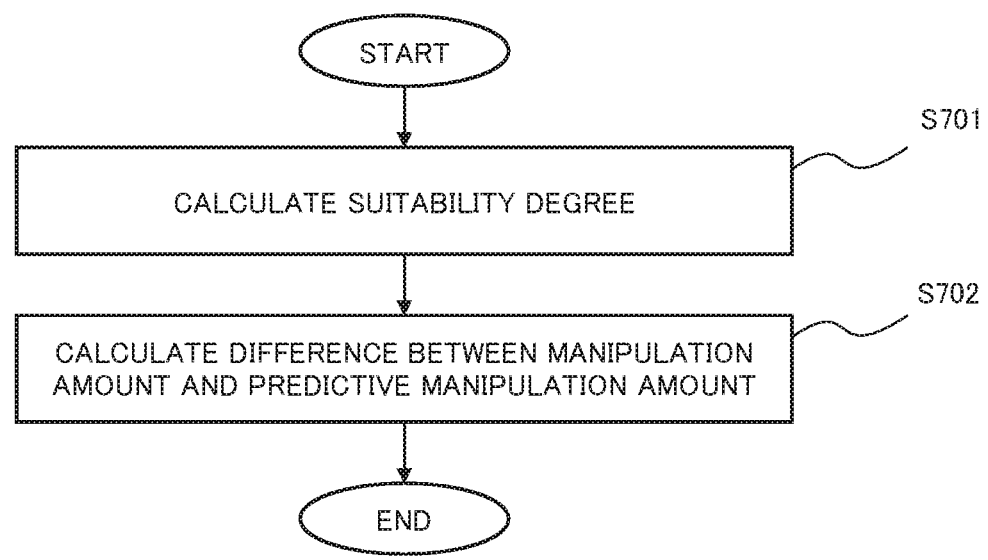
FIG. 7 is a flowchart illustrating a flow of processing in the information processing device according to the third example embodiment.

Next, processing in the information processing device 601 according to the third example embodiment of the present invention will be described in detail with reference to FIG. 7. FIG. 7 is a flowchart illustrating a flow of the processing in the information processing device 601 according to the third example embodiment.

The degree calculation unit 602 calculates a degree of suitability between observation information acquired by observation of the system 201 (FIG. 2) and prediction information predicted by using a model for a state of the system 201 (Step S701).

The system 201 is, for example, a farming system in which a crop is cultivated in a field. For example, when a crop is cultivated in a field, a device such as an irrigation pipe and a pivot is installed in the field. These devices irrigate soil in the field in accordance with an instruction such as pressure of water transmitted from a connected pump and a time for transmitting water. The soil in the field is irrigated by using these devices, and thus the farming system is subjected to action (actuation) from these devices. For example, a moisture amount sensor for measuring an amount of moisture in soil is installed in the field. The moisture amount sensor generates observation information representing the measured amount of moisture.

Further, the model is a model (for example, Eqn. 1 and Eqn. 2) capable of predicting a state of the system 201. When the system 201 is the farming system, the prediction model is, for example, a simulation model for rice weather relation, a normalized difference vegetation index, a model (exemplified in Eqn. 7) representing a relevance between pressure of water transmitted from an irrigation pump connected to an irrigation pipe and an irrigation amount, and a model (exemplified in Eqn. 8) representing a relevance between pressure of water transmitted from a pump connected to a pivot and an irrigation amount. When the system 201 is affected by a force (for example, f1 and f2 described above) of an actuator, the model is, for example, a model representing a relevance between the force and a noise.

In Step S701, for example, the degree calculation unit 602 inputs prediction information generated in accordance with the processing indicated by the models and observation information representing a state of the system. The degree calculation unit 602 calculates a degree of suitability between these pieces of input data. For example, the degree calculation unit 602 calculates a degree of suitability between the observation information and the prediction information by performing the processing in accordance with the model likelihood indicated by Eqn. 3.

The difference calculation unit 603 calculates a difference, when the degree calculated by the degree calculation unit 602 satisfies a predetermined calculation condition, between a manipulation amount instructed to a device such as the actuator 202 and an operation amount (predictive manipulation amount) predicted to be performed when the manipulation amount is instructed to the device (Step S702). The operation amount is predicted in accordance with the processing indicated by the model, for example. The difference is a noise included in the input model as described above, a system noise included in the system model, or an observation noise included in the observation model. The predetermined calculation condition is, for example, a condition that the model likelihood exemplified in Eqn. 3 is maximum.

The degree calculation unit 602 can be achieved by using a function similar to the function of the likelihood calculation unit 108 illustrated in FIG. 1, the likelihood calculation unit 408 illustrated in FIG. 4, or the like. The difference calculation unit 603 can be achieved by using a function similar to the function of the noise adjustment unit 107 illustrated in FIG. 1, the noise adjustment unit 407 illustrated in FIG. 4, or the like. Therefore, the information processing device 601 can be achieved by using a function similar to the function of the abnormality detection device 101 illustrated in FIG. 1, the control information generation device 401 illustrated in FIG. 4, or the like.

Next, an advantageous effect related to the information processing device 601 according to the third example embodiment of the present invention will be described.

The information processing device 601 according to the third example embodiment can provide information being a basis for early detection of an abnormality of device. A reason for this is that a difference calculated in regard to the device by the information processing device 601 has a relevance to an abnormality of the device. As described above, the difference is, for example, an input noise included in the input model. The input noise represents, for example, a difference between a manipulation amount instructed to a device such as the actuator 202 and an operation amount performed by the device in accordance with the instruction. For example, a greater value of the difference represents that the device performs manipulation amount further from the instructed manipulation amount. Alternatively, a greater temporal change in this difference represents that a state of the device is more unstable. Therefore, the difference represents information being a basis for early detection of an abnormality of the device such as the actuator 202. Therefore, the information processing device 601 can provide the information being the basis for early detection of the abnormality of the device.

Hardware Configuration Example

A configuration example of hardware resources that achieve an information processing device according to each example embodiment of the present invention will be described. However, the information processing device may be achieved using physically or functionally at least two calculation processing devices. Further, the information processing device may be achieved as a dedicated device.

Figure 8:
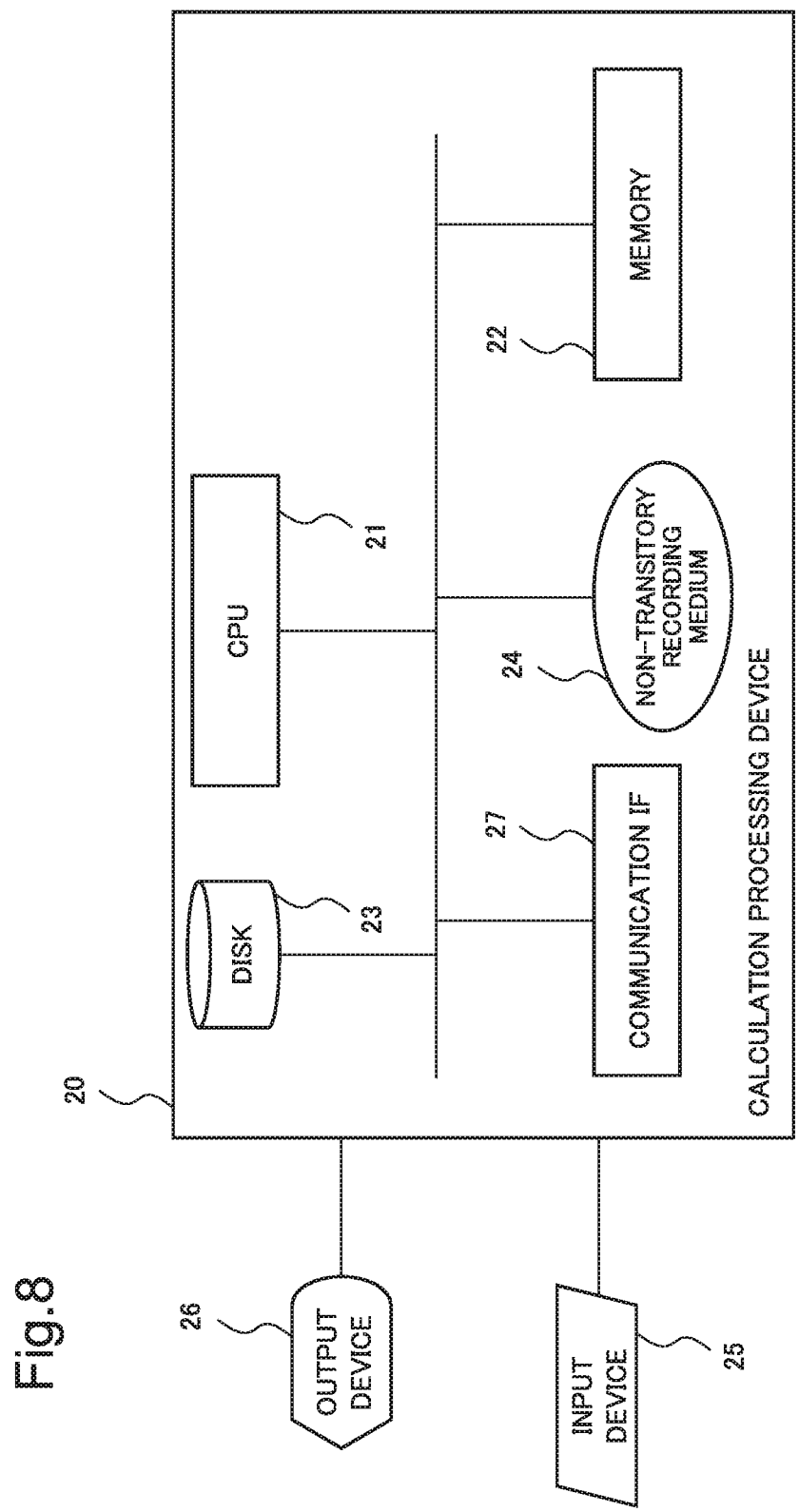
FIG. 8 is a block diagram schematically illustrating a hardware configuration of a calculation processing device capable of achieving an information processing device according to each example embodiment of the present invention.

FIG. 8 is a block diagram schematically illustrating a hardware configuration of a calculation processing device capable of achieving an information processing device according to each example embodiment of the present invention. A calculation processing device 20 includes a central processing unit (CPU) 21, a memory 22, a disk 23, a non-transitory recording medium 24, and a communication interface (hereinafter, referred to as. "communication I/F") 27. The calculation processing device 20 may connect an input device 25 and an output device 26. The calculation processing device 20 can execute transmission/reception of information to/from another calculation processing device and a communication device via the communication I/F 27.

The non-transitory recording medium 24 is, for example, a computer-readable Compact Disc, Digital Versatile Disc. The non-transitory recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored in the disk 23 when executing the program and executes arithmetic processing. The CPU 21 reads data necessary for program execution from the memory 22. When display is needed, the CPU 21 displays an output result on the output device 26. When a program is input from the outside, the CPU 21 reads the program from the input device 25. The CPU 21 interprets and executes a program conversion program (FIG. 3, FIG. 5, or FIG. 7) present on the memory 22 corresponding to a function (processing) indicated by each unit illustrated in FIG. 1, FIG. 4, or FIG. 6 described above. The CPU 21 sequentially executes the processing described in each example embodiment of the present invention.

In other words, in such a case, it is conceivable that the present invention can also be made using the information processing program. Further, it is conceivable that the present invention can also be made using a computer-readable, non-transitory recording medium storing the information processing program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2017-052244, filed on Mar. 17, 2017, the disclosure of which is incorporated herein in its entirety.

REFERENCE SIGNS LIST 101 abnormality detection device
102 noise calculation unit
103 data assimilation processing unit
104 observation model
105 system model
106 input model
107 noise adjustment unit
108 likelihood calculation unit
109 abnormality detection unit
151 observation device
152 input device
153 output device
154 observation information storage unit
155 calculation setting information storage unit
200 control system
201 system
202 actuator
203 observation device
204 controller
401 control information generation device
402 noise calculation unit
403 data assimilation processing unit
404 observation model
405 system model
406 input model
407 noise adjustment unit
408 likelihood calculation unit
409 effect degree calculation unit
410 system control unit
451 observation device
452 input device
453 output device
454 observation information storage unit
455 calculation setting information storage unit
601 information processing device
602 degree calculation unit
603 difference calculation unit
20 calculation processing device
21 CPU
22 memory
23 disk
24 non-transitory recording medium
25 input device
26 output device
27 communication IF
901 observation information
902 observation model
903 system model
904 state estimation

What is claimed is:

1. An information processing device comprising:
a memory storing instructions; and
a processor connected to the memory and configured to executes the instructions to:
calculate a degree of suitability between observation information and prediction information, the observation information observed for a system suffering an effect from a certain device operated in accordance with a manipulation amount, the prediction information predicted in accordance with a model for a state of the system, the model including a parameter of a noise of the manipulation amount;
calculate the parameter of the noise in the model in case that the calculated degree of suitability is greater than a predetermined threshold;
calculate a control gain for controlling the manipulation amount for the certain device in accordance with a predetermined relevance that the manipulation amount is decreased toward an increase of the parameter of the noise; and
determine that an abnormality occurred for the certain device when the calculated noise satisfies a predetermined determination condition.

2. The information processing device according to claim 1, wherein the processor is configured to generate the predictive information by predicting a state of the system in accordance with the model.

3. The information processing device according to claim 1, wherein
the predetermined determination condition is a condition that the difference is equal to or more than a predetermined threshold value.

4. The information processing device according to claim 1, wherein
the processor is configured to calculate a timing at which the difference satisfies the predetermined determination condition based on the difference calculated for a plurality of timings.

5. An information processing method, by a calculation processing device, comprising:
calculating a degree of suitability between observation information and prediction information, the observation information observed for a system suffering an effect from an certain device operated in accordance with a manipulation amount, the prediction information predicted in accordance with a model for a state of the system, the model including a parameter of a noise of the manipulation amount;
calculating the parameter of the noise in the model in case that the calculated degree of suitability is greater than a predetermined threshold;
calculating a control gain for controlling the manipulation amount for the certain device in accordance with a predetermined relevance that the manipulation amount is decreased toward an increase of the parameter of the noise; and
determining that an abnormality occurred for the certain device when the calculated noise satisfies a predetermined determination condition.

6. A non-transitory recording medium storing an information processing program causing a computer to achieve:
a degree calculation function configured to calculate a degree of suitability between observation information and prediction information, the observation information observed for a system suffering an effect from an certain device operated in accordance with a manipulation amount, the prediction information predicted in accordance with a model for a state of the system, the model including a parameter of a noise of the manipulation amount;
a difference calculation function configured to calculate the parameter of the noise in the model in case that the calculated degree of suitability is greater than a predetermined threshold;
a function configured to calculate a control gain for controlling the manipulation amount for the certain device in accordance with a predetermined relevance that the manipulation amount is decreased toward an increase of the parameter of the noise; and
a function configured to determine that an abnormality occurred for the certain device when the calculated noise satisfies a predetermined determination condition.

* * * * *